United States Patent [19]

Martin

[11] Patent Number: 4,785,890

[45] Date of Patent: Nov. 22, 1988

[54] GROUND-DRIVEN ROTARY ROW CLEANER

[75] Inventor: Howard D. Martin, Elkton, Ky.

[73] Assignee: Deere & Company, Moline, Ill.

[21] Appl. No.: 40,280

[22] Filed: Apr. 20, 1987

Related U.S. Application Data

[63] Continuation-in-part of Ser. No. 906,612, Sep. 10, 1986, which is a continuation of Ser. No. 705,144, Feb. 27, 1985, abandoned.

[51] Int. Cl.[4] .................. A01B 5/00; A01B 49/04; A01C 5/00
[52] U.S. Cl. .................. 172/29; 172/184; 172/520; 172/522; 172/540; 172/575; 111/52; 111/85
[58] Field of Search .............. 47/9; 111/52, 62, 73, 111/80, 85–88; 172/29, 184, 349, 520, 522, 540, 545, 548, 574, 575

[56] References Cited

U.S. PATENT DOCUMENTS

| | | | |
|---|---|---|---|
| 325,512 | 9/1885 | Elam | 111/62 |
| 617,454 | 1/1899 | Whittier | 172/29 |
| 1,030,156 | 6/1912 | Bermes | 172/29 |
| 1,229,342 | 6/1917 | Steele et al. | 172/29 |
| 2,586,254 | 2/1952 | Pitre | 172/522 |
| 2,748,535 | 6/1956 | Skromme et al. | 47/9 |
| 2,826,133 | 3/1958 | Moss | 172/29 |
| 2,882,982 | 4/1959 | Hobbs | 172/29 |
| 3,173,498 | 3/1965 | Hailbrun | 172/540 |
| 3,306,371 | 2/1967 | Bush | 172/540 |
| 3,605,907 | 9/1971 | Schuring et al. | 172/520 X |
| 4,131,162 | 12/1978 | Schmitz | 172/574 |
| 4,295,532 | 10/1981 | Williams et al. | 172/184 |
| 4,424,869 | 1/1984 | Braucke et al. | 172/349 |
| 4,425,973 | 1/1984 | Williams et al. | 172/574 |
| 4,430,952 | 2/1984 | Murray | 111/85 |
| 4,483,401 | 11/1984 | Robertson | 172/574 |
| 4,585,073 | 4/1986 | Mayeda et al. | 172/158 |
| 4,660,653 | 4/1987 | Mayeda et al. | 172/522 |

FOREIGN PATENT DOCUMENTS

| | | | |
|---|---|---|---|
| 6810893 | 2/1971 | Netherlands | 172/520 |
| 858609 | 3/1980 | U.S.S.R. | 111/88 |

Primary Examiner—James R. Feyrer
Attorney, Agent, or Firm—Ritts, Brickfield & Kaufman

[57] ABSTRACT

The specification discloses an improved row cleaning apparatus to selectively clean away mulch from conservation tilled fields without cultivation of the soil. When mounted on a tractor-drawn planter unit, the cleaning action of the present invention improves depth control and planting speed of the planter unit and facilitates seed germination while retaining the mulch between crop rows for erosion control and yield enhancement. In its planter embodiment, the row cleaner disclosed herein comprises a pair of pointedly toothed wheels journaled for rotation about intersecting axes mounted on the planter unit ahead of the furrow opener. The toothed wheels are mounted with their teeth intermeshed above the soil surface and rotate in planes symmetrically inclined downwardly, outwardly, and forwardly of the direction of travel of the planter unit. The toothed wheels penetrate the soil ahead of the furrow opener to a depth sufficient for the forward motion of the planter unit to drive the wheels in rotation, thereby untangling and selectively clearing mulch from the path of the planter unit, yet not so deep as to substantially cultivate or otherwise disturb the soil. The advancing planter unit is thus presented with substantially bare, untilled soil.

16 Claims, 3 Drawing Sheets

GROUND-DRIVEN ROTARY ROW CLEANER

This is a continuation-in-part of application Serial No. 06/906,612 filed Sept. 10, 1986, which was a continuation of application Ser. No. 06/705,144 filed Feb. 27, 1985 and now abandoned.

The present invention relates to a rotary, ground driven, row cleaner for conservation tillage farming particularly useful in conjunction with row crop planter systems. More specifically, in that application, it relates to a pair of inclined pointedly toothed wheel members mounted on a row planter unit ahead of and aligned with the opening mechanism of the planter to clear away surface mulch and residual vegetation. In more generic utilization, the toothed wheel member pairs are mounted on tractor drawn apparatus ahead of and aligned with an earth engaging cutting device. The present invention is the subject of disclosure document No. 127117, filed May 3, 1984.

Historically, farmers have relied upon conventional or "deep" tilling to prepare their fields for planting. In essence, a moldboard plow, chisel plow, or other cultivating implement is dragged over the fields after harvest of the prior crop to break up the soil to a substantial depth, to cut and bury the residue of the harvest, and to bring deep soil up to the surface. Thereafter, the field must be secondarily tilled by discs or other implements to pulverize the soil, reduce large soil clumps, and level the field to facilitate planting operations. Subsequently, yet another change of implements and pass over the fields with planting apparatus is necessary to place the crop seed in the ground. This method of farming has several disadvantages, principally the susceptibility of cultivated fields to erosion by wind and water run-off and the time and fuel required for the multiple passage of the various implements over the fields.

Within the past several years, the concept of conservation tillage (also known as "no-till" or "low-till" farming) has emerged, whereby the fields are not plowed or cultivated to any substantial degree between crops. Instead, the planter used opens a furrow of predetermined depth in the soil, deposits seeds therein at a predetermined rate, and closes the furrow over the seeds, all in a single pass. Typically, multiple rows are planted simultaneously by a plurality of laterally spaced planter units mounted upon the same implement frame.

The harvesting of row crops normally leaves behind a residue of live and dead vegetation and plant stubble (sometimes known as "residual mulch"), which conservation tillage farmers typically leave in place on the surface after harvest. In no-till and low-till farming of certain crops, moreover, straw or other mulching material may conventionally be added to the field after harvest. In this application, the term "mulch" will be used to refer to both residual mulch and added mulch. The surface mulch serves the dual function of aiding in control of erosion and in fertilizing the soil through decomposition. The benefits of such a mulch cover, however, may be offset by its disadvantages. Many shallow soils have a permanent pan at a depth of 20 to 30 inches which makes them wet during the early planting season. The mulch cover retards evaporation therefrom such that soil moisture remains at unacceptably high levels past optimum planting dates. Unless such soils are planted at low rates of speed, on the order of 3½ miles per hour, the planter unit leaves a furrow which fills with water or erodes when it rains. In addition, surface mulch may be forced into the seed furrow, retaining moisture at the bottom of the furrow. The resultant high moisture levels around the seeds retards germination by maintaining soil temperatures too low and promotes seet rot, thereby reducing crop yield. Matted clumps of surface mulch are not readily severed by the furrow opening means of typical row crop planter units. Rather, theses clumps clog the planters or, as indicated above, may be forced into the seed furrow as it is being opened.

The mulch cover also causes significant depth control problems. Ideally, seeds should be planted at a uniform, optimum depth from the surface. However, the mulch cover usually exhibits considerable variation in thickness from row-to-row and along each row. Thus, the planter must be adjusted to reach adequate depth through the thickest portion of the cover. At that adjustment, however, the seeds may be placed too deeply in areas of thin cover. In addition, the planter heads may "bounce" over clumps of mulch encountered by their furrow openers or depth gauging means, thereby leaving seeds on or too close to the surface.

Quite apart from planting considerations, moreover, mulch may have an adverse impact on other farming operations. For example, certain fertilizers, herbicides, pesticides, and other chemicals are most effective when in immediate contact with the soil. If such chemicals are applied by spraying or dripping, mulch on the fields may block significant quantities from reaching the desired direct soil contact. Mulch tends to clog or otherwise interfere with those applicators which attempt to place chemicals directly on or in the earth, much as mulch interferes with planter units.

These drawbacks have led a number of growers to dispense with mulch entirely, planting into ground essentially cleared of everything but closely-clipped crop stubble. While this solves the problems outlined above, the important advantages of mulch cover are thereby sacrificed. The above-described clearing operations, moreover, consume time and fuel. The present invention, when used in conjunction with row crop planter implements, removes the mulch cover from in front of the advancing planter units, thereby permitting rapid planting with good depth control, yet retains the cover between the rows for erosion control and yield enhancement. The row cleaner described and claimed herein, moreover, leaves the soil substantially undisturbed, thereby retaining the desirable features of no-till farming and avoiding excessive moisture levels in the soil around the planted seeds. This selective or preferential cleaning action, whereby the mulch cover is moved away from the crop rows without concomitant substantial cultivation, displacement or other disturbance of the soil along the crop rows, distinguishes the present invention from the prior art.

The prior art reflects a number of planting implements employing residue clearing apparatus mounted ahead of the planter units. Examples of such prior art apparatus may be found in the following United States patent:

U.S. Pat. No. 4,430,952, Murray, 2/84
U.S. Pat. No. 4,377,797, Peterson et al., 3/83
U.S. Pat. No. 4,295,532, Williams et al., 10/81
U.S. Pat. No. 4,278,036, Buchele, 7/81
U.S. Pat. No. 3,362,361, Morrison, 1/68

Such prior art devices, however, themselves scoop, cultivate or otherwise disturb the soil to a significant degree or are usable only in conventionally tilled soils.

In other words, their operation may be characterized as "indiscriminate," moving mulch and soil with equal effect, rather than preferring or selecting mulch as does the present invention. Thus, the advantages of conservation tillage farming in mulched fields cannot be exploited with the referenced prior art. Moreover, the significant soil disturbance along the seed furrows by the referenced prior art devices permits deep penetration of rain water, thereby retarding germination of the seeds or contributing to erosion of the soil.

The prior art likewise reflects a number of cultivators employing rotating, intermeshed tines. Examples thereof may be found in the following United States patents:

U.S. Pat. No. 3,605,907, Schuring et al., 9/71
U.S. Pat. No. 2,882,982, Hobbs, 4/59

However, these prior art devices are designed and used for deep cultivation of the soil and are thus contrary to the teachings of the present invention.

In accordance with the present invention, each planter unit carries a pair of pointedly toothed wheels ahead of and aligned with the furrow opening and closing means of the planter. The rotational axes of the toothed wheels are disposed at an angle relative to one another and to the line of travel of the planter and are likewise inclined with respect to the vertical plane passing through the seed furrow. The wheels are located at an elevation such that the teeth penetrate the soil to a depth no greater than that required to cause them to rotate about their respective axes without significant disturbance of the soil. The rotary motion thereby imparted to the toothed wheels tends to selectively move the mulch cover aside.

It will be appreciated that clumps of mulch lying along the intended furrow will be pulled apart by the rotating toothed wheels acting in lateral opposition to one another and the sections thereby separated will be displaced to opposite sides of the planter unit. More heavily matted clumps, however, may not be completely untangled and pulled apart by the tooth wheels. Hence, such clumps will remain in the furrower path. This problem can be overcome by mounting the furrow opener and the toothed wheels in close longitudinal proximity to one another. When so arranged, the furrow opener severs the mulch while the same is tensioned by the rotating toothed wheels and, as the implement moves on, the continuing rotation of the toothed wheels moves the severed portions aside.

The present invention is beneficially used in conjunction with planting units to provide selective mulch cleaning over the crop rows and, in the instant application, will primarily be discussed in that setting. It is not, however, limited to such utilization. Rather, the present invention may be employed on a stand-alone basis or in conjunction with chemical applicators, transplanters, grain drills, and other farming implements wherever level bare strips of soil are desired. When so used, an earth engaging cutting device is disposed behind and laterally aligned with the toothed wheels to cut the mulch pulled apart and tensioned by the tooth wheels.

The present invention may best be understood by reference to the following detailed description when considered in conjunction with the accompanying drawings in which.

Figure 1:
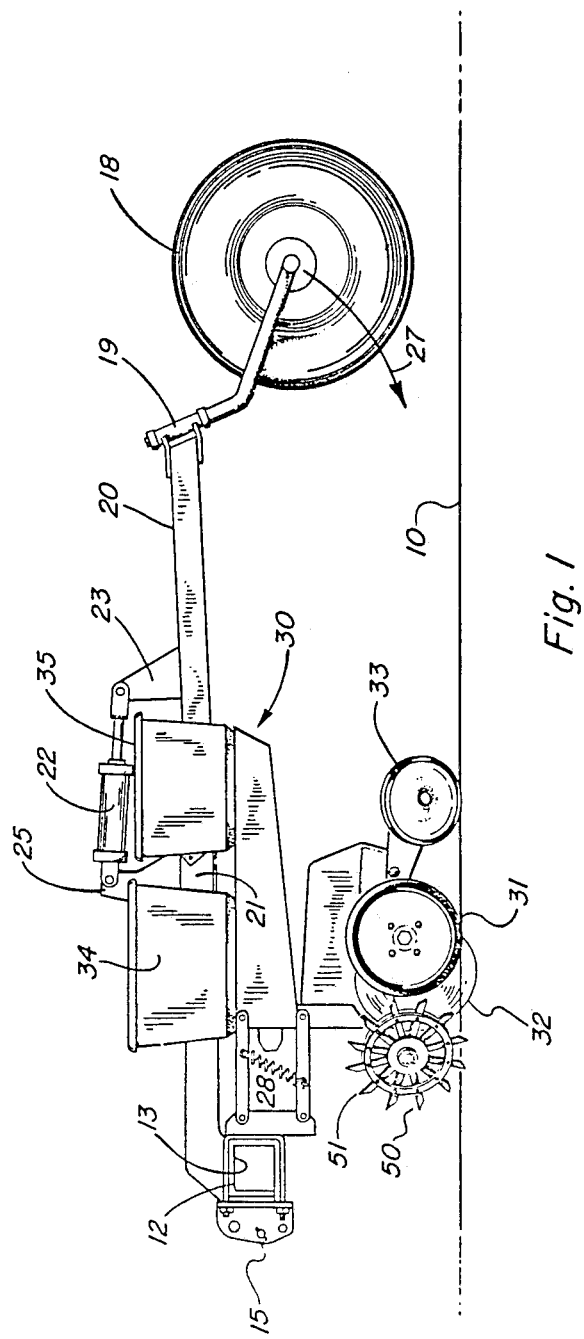
FIG. 1 is a simplified side view of a row crop planter unit carrying the row cleaner of the present invention.

Referring now to the drawings in which the same reference numerals designate the same elements throughout the several views, there is shown in FIG. 1 a simplified side elevational view of a row planter unit carrying the row cleaner of the present invention. Since the planter unit and associated frame are conventional, they are not illustrated in detail, the schematic representation of FIG. 1 being sufficient to depict the relationship between the row cleaner of the present invention and the key components of the planter unit. As shown in FIG. 1, the planter unit generally designated 30 is mounted to a frame generally designated 12 and including a transverse tool bar 13 rigidly connected together by means of cross members (not illustrated in FIG. 1 in the interests of clarity). Preferably, tool bar 13 is constructed of tubular steel of a length dependent upon the number of crop rows for which the system is designed. It will be appreciated that, while FIG. 1 depicts a single planter unit, the frame typically carries a plurality of planter units, one for each crop row, the planter units being laterally spaced from one another at distances corresponding to the desired spacing between crop rows in the field. As an illustrative example, corn or soybean rows are typically spaced 30 or 36 inches apart.

The frame 12 may also be provided with support wheels (again omitted from FIG. 1 in the interests of clarity). Such support wheels and their associated mounting structure are conventional and form no part of the present invention.

As depicted in FIG. 1, the line designated 10 represents the surface of the ground and the movement of the system during normal operation is from right to left. The forward end of frame 12 is provided with a bracket generally designated 15 for mounting the frame to the lower draw points of a conventional three-point hitch carried at the rear of a farm tractor. In addition, one or more rear support wheels 18 may be provided to raise the entire system for road travel. The road wheel is mounted by means of spindle 19 to an articulated frame including pivotally connected members 20 and 21, frame member 21 being rigidly connected to tool bar 13. Hydraulic cylinder 22 is pivotally connected at one end to frame member 20 by means of bracket 23 and pivotally connected at the opposite end to frame member 21 by means of bracket 25. Hydraulic cylinder 22, when extended, lowers wheel 18 in the direction indicated by arrow 27 to the surface of the ground 10 and, as hydraulic cylinder 22 is further extended, the entire frame carrying the planter units is raised for over the road travel. Conversely, when hydraulic cylinder 22 is retracted, wheel 18 is raised off the ground, allowing planter unit 30 to be supported by gauge wheels 31, as will be more fully described hereinafter. Hydraulic fluid pumping means and tubing for actuation of hydraulic cylinder 22 are conventionally carried by the pulling tractor, but are omitted from FIG. 1 in the interests of clarity.

Figure 2:
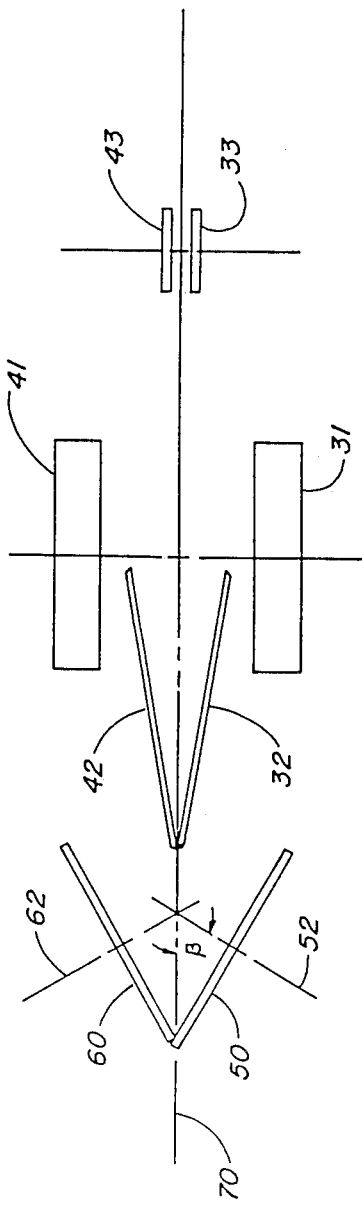
FIG. 2 is a diagrammatic plan view illustrating the angular and spatial relationships among the ground engaging components of the planter unit and row cleaner of the present invention.

Planter unit 30 is mounted behind and to tool bar 13 by means of a separate four-bar linkage generally designated 28. Linkage 28 accommodates variations in the surface of the ground 10 and allows planter unit 30 to generally follow the contours thereof. The conventional planter unit 30 has three key operational components in contact with the ground. The angular and spatial relationships among these components is illustrated in FIG. 2, in which the direction of movement is likewise from right to left. The first such component opens a furrow in the earth to a predetermined depth without substantial disturbance of adjacent soil and, in FIGS. 1 and 2, is depicted as a pair of inclined discs 32 and 42. The details of the furrow opening means form no part of the present invention; a single disc, coulter, or other apparatus performing that function is acceptable, the dual disc opener described herein being purely illustrative. A pair of laterally spaced gauge wheels 31 and 41 follow the furrow opening means and support planter unit 30 as it is pulled across the field. Gauge wheels 31 and 41 are journaled for rotation about axes substantially perpendicular to the direction of travel and are substantially equidistant from and on opposite sides of the seed furrow. It will be appreciated that gauge wheels 31 and 41 may rotate in substantially vertical planes, in which case they will share a common axis of rotation, or may rotate in planes which are inclined from the vertical, in which case their respective axes of rotation will intersect. The vertical relationship between the furrow opening means and the gauge wheels 31 and 41 determine the depth of the seed furrow. Conventionally, the furrow opening means are vertically fixed in position and gauge wheels 31 and 41 raised or lowered by means (not shown) to regulate the seed furrow depth. However, it will be appreciated that depth regulation may be likewise obtained by vertically fixing the axes of rotation of gauge wheels 31 and 41 and providing for vertical adjustment of the furrow opening means or by providing for vertical adjustment of both the furrow opening means and gauge wheels 31 and 41. In any event, the depth of the furrow will be the distance which the furrow opening means projects below the rims of gauge wheels 31 and 41.

Trailing behind gauge wheels 31 and 41 are furrow closing means, depicted in the figures as a pair of inclined pinch wheels 33 and 43. Once again, this component of planter unit 30 is conventional and the embodiment illustrated herein is merely illustrative. A single wheel or other conventional furrow closing means may readily be substituted therefor without departing from the present invention.

Planter unit 30 includes seed storage hopper 34, the latter being provided with a conventional metering mechanism (not shown) to regulate the flow of seed from hopper 34. Planter unit 30 may also include a pesticide/fertilizer storage hopper 35 with associated metering mechanism (not shown) to regulate the flow of pesticide or fertilizer from hopper 35.

The operation of planter unit 30 is well known in the art. As the system is moved across the field by a tractor (not shown) to which mounting bracket 15 has been attached, discs 32 and 42 penetrate the earth along a moving zone of contact, thereby opening a narrow furrow. The metering mechanism (not shown) associated with hopper 34 dispenses seed into a tube (not shown) at a rate bearing a predetermined relationship to the travel of the planter unit 30. The outlet of the tube is located between gauge wheels 31 and 41, so that the metered seed from hopper 34 is deposited in the furrow. If pesticide or fertilizer is stored in hopper 35, it may likewise be metered and deposited via another tube into the furrow between gauge wheels 31 and 41. Trailing pinch wheels 33 and 43 in turn close the furrow over the seed.

The foregoing describes the idealized operation of a planter unit without the row cleaner of the present invention, assuming operation over bare earth. As noted earlier in this application, however, significant advantages accrue from a mulch cover over the field. But, as also outlined above, in a conventional planter unit the mulch may be forced into the furrow by discs 32 and 42 or may cause gauge wheels 31 and 41 to raise above ground level, thereby reducing the depth of the furrow. The present invention, comprising rotating toothed wheels 50 and 60 mounted ahead of each planter unit, reliably clears the mulch cover from the path of the planter unit 30 such that the furrow opening means, gauge wheels, and furrow closing means operate over essentially bare earth while the desirable mulch cover is maintained between rows.

Figure 3:
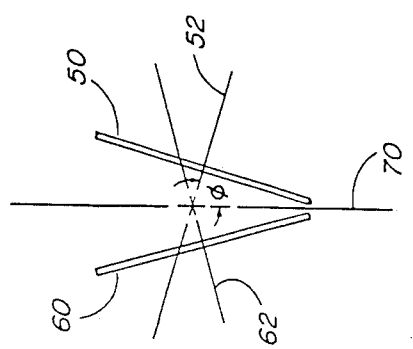
FIG. 3 is a diagrammatic front elevation view illustrating the angular disposition of the ground engaging components of the row cleaner of the present invention.

As illustrated in FIGS. 2 and 3, toothed row cleaning wheels 50 and 60 are independently journaled for rotation about inclined, intersecting axes. In particular, row cleaning wheel 50 rotates about axis 52 and row cleaning wheel 60 rotates about axis 62. The details of means for rotatably mounting cleaning wheels 50 and 60 to planter unit 30 are not a part of the present invention and may, for example, be those described in U.S. Pat. No. 4,425,973 issued on Jan. 17, 1984, in the name of Donald E. Williams and Forest E. Robertson. It will be observed that the axes of rotation 52 and 62 intersect at a point substantially within an imaginary vertical plane, indicated in FIGS. 2 and 3 by broken line 70 passing midway between gauge wheels 31 and 41, said point of intersection being behind and above (as viewed from the side as in FIG. 1) the respective centers of rotation of wheel members 50 and 60. Thus, the compound angular relationship between each axis of rotation and that imaginary vertical plane may be defined by its vertical component $\phi$ and its horizontal component $\beta$. The compound angular relationship above described may also be defined by the vertical and horizontal components of the angle between each plane of rotation of cleaning wheels 50 and 60 and the aforementioned imaginary vertical plane. Since the axes of rotation are, by definition, perpendicular to the plane of rotation and the imaginary vertical plane is the complement of $\phi$ and the horizontal component of that angle is the complement of $\beta$.

Row cleaning wheels 50 and 60 are mounted to planter unit 30 at a height such that the teeth thereof penetrate the soil to a depth sufficient for the forward motion of the system to cause the wheels to rotate, yet not so deep as to substantially cultivate, displace, or otherwise disturb the soil. That rotation brings the teeth of cleaning wheels 50 and 60 successively into and out of engagement with the ground along a moving contact zone. As cleaning wheels 50 and 60 rotate, the teeth at their lower peripheries engage the strands of mulch at and adjacent the earth's surface, imparting forces whose respective lateral components are directed away from the furrower path as the implement advances. Toothed cleaning wheels 50 and 60 thus work in opposition to one another, tending to pull the mulch in opposite directions at the same time. By pointing the ends of the teeth, the tooth cross section in contact with the earth is reduced and the teeth loosen and tear the roots of subsurface residual vegetation so that the same may be more easily swept aside. The rotating teeth of the cleaning wheels 50 and 60, directly ground-driven and configured as they are like the tines of a rake or fork, have greater motive effect on the mulch than they do on the underlying soil. In other words, the rotating toothed wheels displace the mulch in preference to displacing the soil. Accordingly, shallow penetration provides virtually complete mulch removal. The rotation of the row cleaning wheels thus selectively moves the mulch cover aside as the system traverses the field, leaving the conservation tilled soil substantially undisturbed. The minimal effects of the shallow soil distrubance caused by the cleaning wheels 50 and 60 are further reduced by the action of the pinch wheels 33 and 43 or other conventional furrow closing means as they close the seed furrow and tamp the soil. As outlined above, this contrasts with the indiscriminate earth-working action of prior art row clearing apparatus which results in undesirable soil erosion, higher fuel consumption, and slower planting rates.

Figure 5:
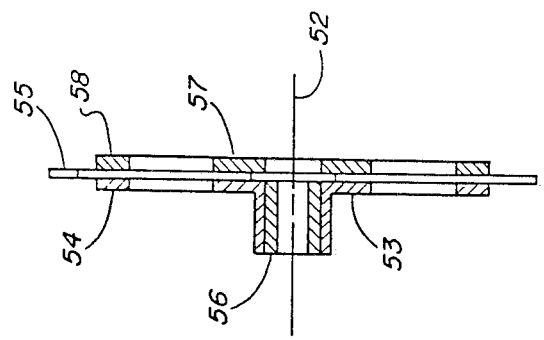
FIG. 5 is a sectional view taken along lines 5—5' of FIG. 4.
Figure 4:
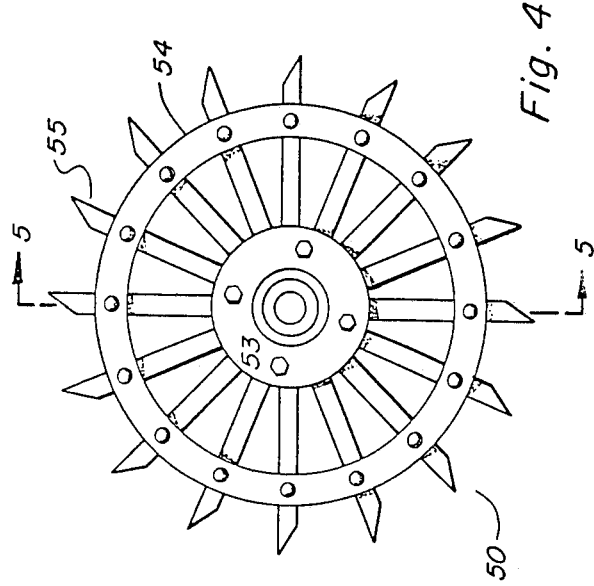
FIG. 4 is a side view of one embodiment of the row cleaning wheel employed in the present invention.

FIGS. 4 and 5 illustrate one embodiment of the row cleaning wheels which may be readily fabricated from materials generally available to the average farmer. As shown therein, row cleaning wheel 50 is comprised of hub member 53 carrying bearing 56, a plurality of pointed spoke members 55, rim members 54 and 58, and washer-shaped backing plate member 57. Bearing 56 is mounted for rotation about axis 52 and, although illustrated as a sleeve bearing, may be of any conventional construction, such as roller or ball bearing. Each of the spoke members 55 may be fabricated from mild steel bar stock by cutting to length and grinding one end to a point. Although FIG. 5 depicts a sharply pointed asymmetric end, it will be appreciated that a blunter or more symmetric point configuration may be used. In a preferred embodiment $\frac{1}{4}'' \times \frac{1}{2}''$ bar stock is used. The inner ends of spoke members 55 are disposed, generally equidistantly from one another around a circle centered at axis of rotation 52, between the flanged portion of hub member 53 and backing plate member 57 and attached thereto, by rivets, screws, or other conventional fasteners (not shown). Spoke members 55 are likewise sandwiched, near their outer ends, between and affixed to rims 54 and 58, generally equally spaced about the circumference thereof. Thus, hub member 53 and backing member 57 support the spoked members 55 at their inner ends for rotation about axis 52 and rim members 54 and 58 support and maintain the angular relationships between the spoke members 55 near their pointed outer ends. It will be appreciated that one or both rim members 54 and 58 or backing member 57 may be omitted if the remaining structure is sufficiently strong to support spoked members 55.

Surface mulch may include clumps or masses of tangled vegetable matter. Clumps lying to one side or the other in relation to the path of the furrow opener encountered by one toothed row cleaner wheel of the present invention are moved further away from the path—clumps on the left are displaced to the left while clumps on the right are displaced to the right. Thus, each of the rotating wheels act with a lateral force upon the mulch, a lateral force directed away from the planter unit's path of travel.

When, however, both rotating toothed wheels of the present invention encounter the same mass of tangled vegetable material along the path followed by the furrow opener, the left wheel tends to mvoe that portion of the mass lying to the left of the furrow path aside to the left while the right wheel tends to move the other portion of the mass aside to the right. The coaction of the rotating wheels thereby applies forces to the mass extending laterally in opposite directions away from the furrow path. The strands of vegetable material forming the mass along the furrow path are thereby tensioned and pulled apart by the toothed wheels as they rotate. Thus, the mass is untangled by the coaction of the advancing wheel pair, much as a pile of spaghetti would be separated by two forks working in opposite directions. Indeed, the denser and more entangled the mulch is, the more effectively it can be displaced by the rotating toothed wheels.

Heavily matted clumps, may not be completely separated by the action of the toothed wheels alone. Instead, longer strands of vegetable material may remain entangled with both portions of the matted clump. Under those conditions, the coaction of the rotating toothed wheels has tensioned the connecting strands laterally of the planter's path of travel and will continue to do so as the planter unit advances. When so held apart in tension, the connecting strands will be cut by the front edge of the furrow opener. Thus, although the pair of rotating toothed wheels may not have completely untangled the matted clump, their coaction pulls the connecting strands in opposite directions so that the advancing furrow opener cleanly cuts the tensioned strands and the rotating wheels thereafter sweep the then servered clump portions aside.

The foregoing describes the present invention used in conjunction with conventional row crop planters, wherein the inclined discs which open the seed furrow also function to cut the strands of mulch tensioned by the toothed wheels. It is readily apparent that a single disc or other conventional furrow opener would likewise perform that mulch severing function in much the same manner. As noted above, however, the present invention is not limited to such use. Indeed, grain drills, transplanters, and other implants benefiting from operation over level bare strips of substantially untilled earth are prime candidates for the cleaning wheels of the present invention, as are high pressure or dribble fertilizer applicators, anhydrous ammonia applicators, or other apparatus for application of chemicals directly to the soil. Such other equipment, however, typically does not slice into the ground like the furrow opener of a row crop planter, Accordingly, if the cleaning wheels of the present invention are mounted on such other equipment without further modification, the clumps of mulch pulled apart and held in tension by the toothed wheels will not be severed as the apparatus is moved across the field. In order to provide that mulch severing action, therefore, an earth engaging cutting device is mounted in essentially the same lateral and longitudinal relation to the toothed wheels as the above described furrow opener characteristic of row crop planter units. Such a device may be, for example, as simple as a single disc journaled for rotation about a horizontal axis perpendicular to the direction of travel. Since such a cutting device functions only to sever the tensioned mulch, it need not enter the soil to the same depth as does a furrow opener. Analogously with the toothed row cleaning wheels themselves, the cutting device should penetrate the soil no deeper than required by its mulch severing function. The surface of the earth acts much as a cutting board or other support against which the edge of the disc operates to sever the mulch. Satisfactory results for a single disc rotating cutter may be obtained at depths about the same as those to which the toothed cleaning wheels penetrate.

The toothed cleaning wheel pairs of the present invention need not be used concurrently with any other implement, but have utility for independent operation. Thus, for example, in wet early planting season conditions, the cleaning wheels of the present invention may be used on a stand-alone basis to clear strips of mulch from the intended crop rows a few days before planting. As the sun warms these cleared strips, moisture will evaporate from the top layer of the soil (the surface and adjacent underlying portions to a depth of about 1 inch) to present the furrow opener with a drier surface on which to operate. Likewise, such cleared strips make for more effective pre-planting application of chemicals directly to the soil or more effective post-cleaning use of grain drills, transplanters, or other implements. As described above, such stand-alone applications require an earth engaging cutting device mounted in essentially the same lateral and longitudinal relation to the toothed wheels as the above described furrow opener characteristic of row crop planter units.

The furrow opener (or cutting disc) and toothed wheels should be located longitudinally close together, consistent with accomplishing the above-described tensioning function in the mulch on the particular field being cleaned. To adapt the unit for differing mulch conditions, fore-and-aft adjustment may be provided for the furrower (or cutting disc) mounting or the cleaning wheel mounting, or both.

Figure 7:
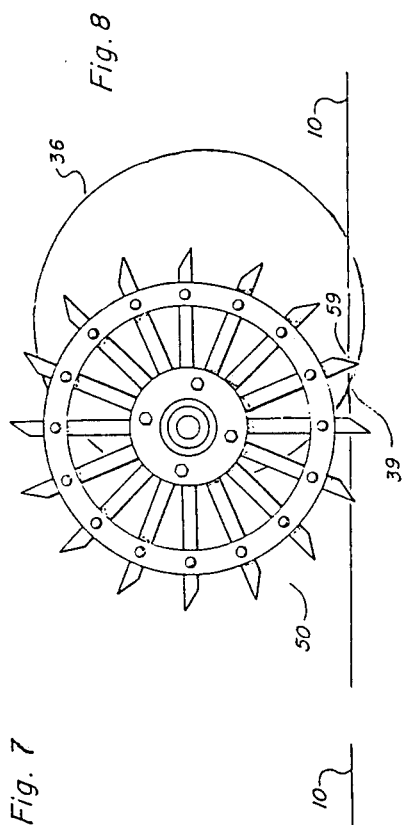
FIG. 7 is a partial simplified side view of the planter unit's furrow opener and the row cleaner of the present invention longitudinally arranged in accordance with the embodiments illustrated in FIG. 6.
Figure 6:
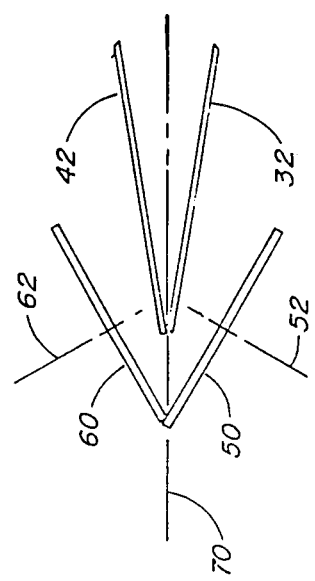
FIG. 6 is a diagrammatic plan view illustrating the angular and spatial relationships among certain of the ground engaging components of the row cleaner in a preferred embodiment of the present invention.

FIG. 6 diagrammatically illustrates the desired proximate longitudinal relationship between the toothed wheels 50 and 60 and the furrow opener discs 32 and 42. Note that FIG. 7 depicts in stylized fashion toothed wheel 50 and furrow opener disc 32; in the interests of clarity, other components and supporting structure have been omitted from this view. Optimally, the leading edge 39 of disc 32 enters the ground at surface 10 at or ahead of (as viewed from the side as in FIG. 7) the longitudinal position of the trailing edge 59 of the toothed wheel 50 as the latter loses contact with the ground. Thus, in a preferred embodiment of the present invention, the furrow is continuously opened at a point ahead of the rotating toothed wheels' points of disengagement from the ground as the planter unit advances along the row. As the opener slices a furrow in the earth, it also slices through any strands of partially untangled mulch pulled apart by the toothed wheel pair.

If, contrary to the above teaching, the furrow opener's leading edge is located behind the toothed wheel's trailing edge, there exists the possibility that the toothed wheels may carry the still somewhat tangled clumps around as they rotate, thereby clogging the cleaner unit. In addition, even if the partially untangled clumps instead drop to the ground from the trailing edges of the toothed wheels, the laterally opposing forces will no longer be applied to the fallen clumps. When tension is thereby released before the arrival of the furrow opener, the connecting strands may be forced into the seed furrow by the advancing furrow opener, rather than being cleanly cut by the furrow opener at the surface and swept aside by the row cleaning wheels. Accordingly, the close mounting depicted in FIGS. 6 and 7 improves performance in fields covered with heavily matted clumps of mulch.

Figure 8:
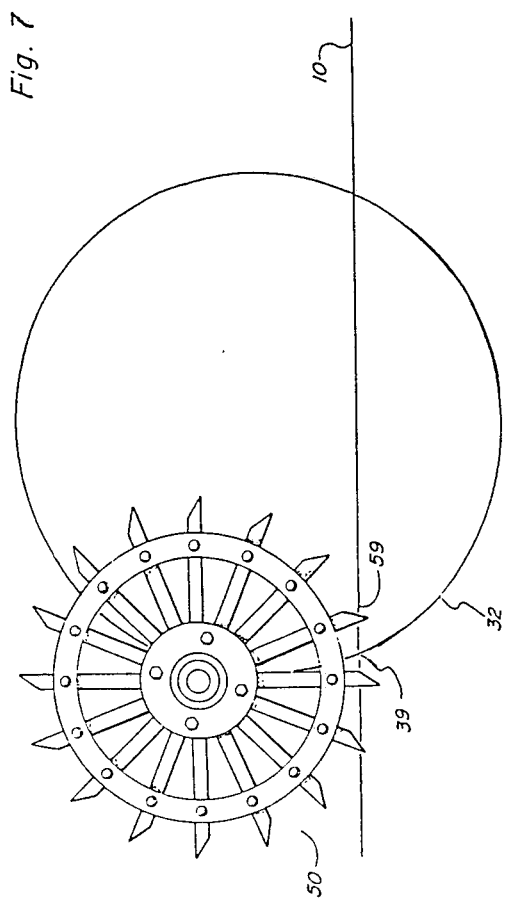
FIG. 8 is a partial simplified side view of an embodiment of the present invention utilizing a single disc cutting device disposed behind a pair of toothed wheels.

An embodiment of the present invention used as a stand-alone row cleaner or utilized in conjunction with chemical applicators or other non-planter equipment is depicted in simplified partial side elevation as FIG. 8. This embodiment is generally similar to the planter-mounted equipment shown in FIG. 1, but differs therefrom in that the seed/fertilizer storage hoppers, metering and delivery mechanisms are absent, as are the furrow closing wheels, and that a single cutting disc 36 is substituted for the furrow opener. As with the aforementioned planter-mounted equipment, the row cleaning unit is mounted behind and to a tool bar through a four-bar linkage or other conventional means (not shown in FIG. 8) to accommodate the contour of the ground 10. Each row cleaning unit comprises a pair of toothed cleaning wheels rotatably mounted via conventional means for carriage at a predetermined height above the surface of the ground. Following the toothed wheel pair 50–60 is a single disc cutter 36 journaled for rotation about a horizontal axis perpendicular to the direction of travel, said axis being indicated by reference number 38 in FIG. 9. Gauge wheels 31 and 41 support the row cleaning assembly. It will be appreciated that the components of each row cleaner—toothed wheel pair 50–60, disc cutter 36, and gauge wheels 31 and 41—may be mounted to a subframe (not shown in FIG. 8) extending from the four-bar linkage or other implement mounting means (also not shown in FIG. 8). As shown in FIG. 8, the disc cutter 36 penetrates the soil to a depth approximately equal to or less than the maximum depth at which the teeth of toothed wheels 50 and 60 operate. Note that FIG. 8 depicts in stylized fashion toothed wheel 50 and cutting disc 36; in the interests of clarity, other components and supporting structure have been omitted from this view.

Figure 9:
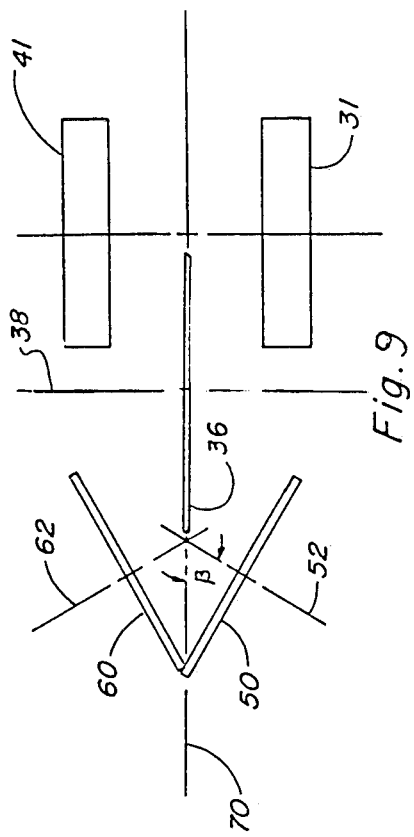
FIG. 9 is a diagrammatic plan view illustrating the angular and spatial relationships among the ground engaging components of the row cleaner in the embodiment of the present invention illustrated in FIG. 8.

FIG. 9 diagrammatically illustrates the angular relationships in a horizontal plane between the toothed wheels in each pair, as well as the spatial relationship among the ground engaging components of this embodiment of the present invention. Toothed wheels 50 and 60 are disposed generally symmetrically about an imaginary vertical plane 70 extending through the path of travel followed by cutting disc 36. As with the dual disc furrow opener, the leading edge of disc 36 optimally enters the ground at surface 10 at or ahead of (as viewed from the side as in FIG. 8) the longitudinal position of the trailing edge 59 of the toothed wheel 50 as the latter loses contact with the ground. Accordingly, as the row cleaning assembly traverses the ground, the toothed wheels 50 and 60 are rotatably driven to work in lateral opposition to one another, separating and raking mulch lying in a strip along the path of travel in laterally opposite directions away therefrom. Cutting disc 36 is likewise rotatably driven by the movement of the apparatus across the field to provide a rolling slicing action adjacent the initial point of contact 59 with ground surface 10 where it severs strands of mulch laterally tensioned by toothed wheels 50 and 60. Gauge wheels 31 and 41 trail behind cutting disc 36 and are disposed substantially symetrically about the aforesaid imaginary vertical plane 70. The angular relationship, in a vertical plane perpendicular to the direction of travel, between the toothed wheels in each pair is illustrated in FIG. 3.

In the illustrated embodiments, cleaning wheels 50 and 60 are angularly disposed and dimensioned so as to intersect, with teeth intermeshed, above the surface of the ground 10 at a height less than one-half of their root diameter. It is believed that the intermeshing of the teeth prevents mulch from clinging to the teeth. In a preferred embodiment, row clearing wheels 50 and 60 each have an outer diameter of 16 inches with 16 equally spaced 1½ inch deep teeth and are each journaled for rotation about an axis disposed at angle $\phi$ of 75° from the vertical and angle $\beta$ of 60° from the path of travel of the planter unit. Using the alternate definition described above, the respective planes of rotation of row cleaning wheels 50 and 60 are each disposed at 15° from the vertical and 30° from the path of travel of the planter unit.

It must be recognized that the above-referenced preferred embodiment is only one within a wide range of variables. Thus, the diameter of cleaning wheels 50 and 60, which may be limited by the equipment dimensions and configuration, may range from about 10 to 20 inches and their tooth depths may range from about ½ inch to 3 inches. Likewise, the cleaning wheels may be inclined such that the vertical component of the angle at which their axes of rotation intersect (twice $\phi$) ranges between about 120° and 160° and the horizontal component of the angle at which their axes of rotation intersect (twice $\beta$) ranges between about 90° and 150°.

The details of the means for mounting the row cleaning wheel assemblies to a subframe or the planter unit frame are not a part of the present invention and may, for example, be as described in the above-cited Williams and Robertson patent. The optimum depth to which the toothed wheels penetrate the earth will depend upon the particular conditions encountered in the field. In general, the degree of penetration should be set at the minimum necessary to provide satisfactory mulch clearing. Under conditions which the conservation tillage farmer may reasonably expect to find, the row clearing wheel teeth in the preferred embodiment referenced above penetrate the soil to a depth ranging approximately from between ½ inch to 1¼ inches. It will be appreciated that, where a planter unit which carries the row cleaner of the present invention regulates planting depth by vertically adjusting the gauge wheels, the row cleaner must likewise be carried so as to be vertically adjustable in like amounts, thereby regulating the depth of penetration of the teeth carried by the row clearing wheels. The above-referenced Williams and Robertson patent illustrates one such vertically-adjustable mounting structure. On the other hand, if a carrying planter unit employs vertically fixed gauge wheels, with vertically adjustable furrow opening means, the row cleaner of the present invention need not be mounted to permit vertical adjustment. The same mounting considerations are applicable to stand-alone row cleaners of the present invention, as well as those carried by non-planter equipment.

Having thus described in detail in preferred embodiment of the invention, persons skilled in the art will be able to modify certain of the structure illustrated and described herein and substitute therefor equivalent elements while continuing to practice the principles of the invention. Therefore, it is intended that any and all such modifications and substitutions be covered and they are embraced within the scope and spirit of the appended claims.

I claim:

1. Apparatus, adapted for propulsion by a tractor along a predetermined path of travel, for selectively cleaning organic mulch from the surface of minimally tilled or untilled soil comprising:

an earth engaging mulch cutting device, a pair of pointedly toothed wheels in front of said cutting device operating in lateral opposition to one another, said toothed wheels being journaled for rotation about respective axes and positioned with the centers of said toothed wheels above said surface on opposite sides of and, angled relative to an imaginary vertical plane passing through the path of travel of said cutting device and the teeth thereof in shallow contact with the ground ahead of said cutting device, wherein the profiles of teeth in contact with the ground present no major soil disturbing surfaces, whereby the forward motion of said apparatus rotatably drives said toothed wheels about their respective axes of rotation, the teeth of said wheels simultaneously pulling surface organic mulch in laterally opposite directions away from the path of the advancing cutting device.

2. The improvement of claim 1 wherein said cutting device and said toothed wheels are so longitudinally positioned with respect to one another that the advancing cutting device enters the surface of the ground at or ahead of the point at which said toothed wheels lose contact with the ground, whereby said toothed wheels hold at least a portion of said surface mulch in tension to be severed by said cutting device.

3. The apparatus of claim 1 wherein said cutting device is a furrow opening means.

4. The apparatus of claim 3 wherein said furrow opening means comprises at least one disc included as one component of a row crop planter unit.

5. In a tractor propelled implement including at least one planter unit, each such planter unit including means for opening a furrow in minimally tilled or untilled soil to a predetermined depth and means for depositing seed in said furrow, wherein the improvement comprises means for selectively cleaning organic mulch from the surface of said soil comprising:

a pair of pointedly toothed wheels journaled for rotation about respective axes and carried by said implement positioned with the centers of said toothed wheels disposed above said surface on opposite sides of and, angled relative to an imaginary vertical plane passing through the path of travel of said furrow opening means and the teeth of said wheels in shallow contact with the ground ahead of said furrow opening means, wherein the profiles of teeth in contact with the ground present no major soil disturbing surfaces, whereby the forward motion of said implement rotatably drives said toothed wheels about their respective axes of rotation, the rotary and forward motion of said toothed wheels separating and displacing the organic mulch laterally from the path of the advancing furrow opening means of said planter unit in preference to displacing said soil.

6. The improvement of claim 5 wherein the respective axes of rotation of said toothed wheels extend downwardly away from said imaginary vertical plane forwardly in relation to said direction of travel of said planter unit.

7. The improvement of claim 6 wherein said toothed wheels intermesh above the surface of said soil forwardly of and below the centers of said toothed wheels.

8. The improvement of claim 6 wherein said toothed wheels are disposed substantially symmetrically about said imaginary vertical plane.

9. The improvement of claim 8 wherein each of said toothed wheels is angularly disposed with its plane of rotation at a horizontal angle of substantially 15° with respect to said imaginary vertical plane.

10. The improvement of claim 5 wherein the teeth of said toothed wheels penetrate the soil to a depth ranging approximately from between ½ inch to 1¼ inches below the surface.

11. The improvement of claim 5 wherein said furrow opening means and said toothed wheels are so longitudinally positioned with respect to one another on said implement that the advancing furrow opening means enters the surface of the ground at or ahead of the point at which said toothed wheels lose contact with the ground, whereby said toothed wheels hold at least a portion of said surface mulch in tension to be severed by said furrow opening means.

12. In a tractor propelled implement including at least one planter unit, each such planter unit including means for opening a furrow in minimally tilled or untilled soil to a predetermined depth and means for depositing seed in said furrow, wherein the improvement comprises means for selectively cleaning organic mulch from the surface of said soil comprising:
   a pair of pointedly toothed wheels operating in lateral opposition to one another, said toothed wheels being journaled for rotation about respective axes and carried by said implement positioned with the centers of said toothed wheels above said surface on opposite sides of and angled relative to an imaginary vertical plane passing through the path of travel of said furrow opening means and the teeth thereof in shallow contact with the ground ahead of said furrow opening means,
   wherein the profiles of teeth in contact with the ground present no major soil disturbing surfaces,
   whereby the forward motion of said implement rotatably drives said toothed wheels about their respective axes of rotation to simultaneously pull surface organic mulch in laterally opposite directions away from the path of the advancing furrow opening means of said planter unit.

13. The improvement of claim 12 wherein said furrow opening means and said toothed wheels are so longitudinally positioned with respect to one another on said implement that the advancing furrow opening means enters the surface of the ground at or ahead of the point at which said toothed wheels lose contact with the ground, whereby said toothed wheels hold at least a portion of said surface mulch in tension to be severed by said furrow opening means.

14. In a tractor propelled implement including at least one planter unit, each such planter unit including means for opening a furrow in minimally tilled or untilled soil to a predetermined depth and means for depositing seed in said furrow, wherein the improvement comprises means for selectively cleaning organic mulch from the surface of said soil comprising:
   a pair of ground driven rotary cleaners, each cleaner disposed about a respectively angled axis on a respective side of an imaginary vertical plane passing through the path of travel of said furrow opening means said pair operating in lateral opposition to one another, each of said row cleaners including
   a hub member rotatably carried by said implement for rotation about a predetermined axis extending downwardly away from said imaginary vertical plane forwardly in relation to said path of travel, a plurality of angularly spaced tines mounted on and extending radially from said hub member, and means for maintaining the angular relationship among said tines,
   said row cleaners being positioned on said implement with their respective hubs above said surface and the outer ends of said tines in shallow contact with the ground ahead of said furrow opening means,
   wherein the profiles of said tines in contact with the ground present no major soil disturbing surfaces,
   whereby the forward motion of said implement rotatably drives said tines about their respective axes of rotation to simultaneously pull surface organic mulch in laterally opposite directions away from the path of the advancing furrow opening means of said planter unit.

15. The improvement of claim 14 wherein said means for maintaining the angular relationship among said tines comprises a generally circular rim member affixed to each of said tines near the outer end thereof and concentrically mounted with respect to said hub member's axis of rotation.

16. The improvement of claim 14 wherein said furrow opening means and said row cleaners are so longitudinally positioned with respect to one another on said implement that the advancing furrow opening means enters the surface of the ground at or ahead of the point at which said tines lose contact with the ground, whereby said toothed wheels hold at least a portion of said surface mulch in tension to be severed by said furrow opening means.

* * * * *